United States Patent [19]

Drent

[11] Patent Number: 4,879,417
[45] Date of Patent: Nov. 7, 1989

[54] PROCESS FOR CARBONYLATION OF ALKENES TO KETONES

[75] Inventor: Eit Drent, Amsterdam, Netherlands

[73] Assignee: Shell Oil Company, Houston, Tex.

[21] Appl. No.: 223,815

[22] Filed: Jul. 25, 1988

[30] Foreign Application Priority Data

Aug. 3, 1987 [GB] United Kingdom ................. 8718307

[51] Int. Cl.$^4$ ............................................. C07C 45/50
[52] U.S. Cl. ................................................. 568/387
[58] Field of Search ................................ 568/311, 387

[56] References Cited

U.S. PATENT DOCUMENTS

| | | | |
|---|---|---|---|
| 3,059,031 | 10/1962 | Alderson | 250/597 |
| 4,487,972 | 12/1984 | Hoag et al. | 568/311 |
| 4,740,625 | 4/1988 | Drent | 568/311 |

FOREIGN PATENT DOCUMENTS

| | | | |
|---|---|---|---|
| 048980 | 9/1981 | European Pat. Off. | 568/387 |
| 048918 | 4/1982 | European Pat. Off. | 568/387 |
| 079592 | 5/1983 | European Pat. Off. | 568/387 |
| 117575 | 9/1984 | European Pat. Off. | 568/387 |
| 129002 | 12/1984 | European Pat. Off. | 568/387 |
| 2445193 | 4/1976 | Fed. Rep. of Germany | 568/387 |
| 2088870 | 6/1982 | United Kingdom | 568/387 |
| 2185740 | 7/1987 | United Kingdom | 568/387 |

*Primary Examiner*—James H. Reamer

[57] ABSTRACT

A process for the preparation of ketones by carbonylation of alkenes with carbon monoxide, using a catalyst system comprising: component (a) a ruthenium compound, and component (b) at least one acid selected from hydrohalogenic acids and carboxylic acids having a p$K_a$ value $\geq 3$ (measured at 25° C. in aqueous solution), with said process being carried out in a water miscible solvent, at a operational pressure in the range of from about 20 bar to about 100 bar and at a temperature in the range of about 70° C. to about 200° C.

17 Claims, No Drawings

PROCESS FOR CARBONYLATION OF ALKENES TO KETONES

FIELD OF THE INVENTION

This invention relates to a process for the carbonylation of alkenes to ketones and more particularly of alkenes having 2–4 carbon atoms, in the presence of a catalyst comprising at least one noble metal compound, selected from Group VIII of the Periodic Table of the Elements and containing one or more coordinating anions, and in the presence of water as a hydrogen source.

BACKGROUND OF THE INVENTION

U.S. Pat. No. 3,059,031 discloses the preparation of pentanone-3 by reacting ethylene, carbon monoxide and water at a temperature above 100° C. and a pressure above 100 atmospheres, in the presence of a catalyst, consisting essentially of at least one halide of a Group VIII noble metal of atomic number 44–78 and being present in an amount of at least 0.00001 mole per mole of ethylene. A preferred temperature range is indicated as being the range of 150°–300° C. and a preferred pressure is indicated as being pressure of at least 200 atmospheres.

Moreover, it is indicated in column 2, lines 38–64, of U.S. Pat. No. 3,059,031 that an organic derivative of a Group V element of atomic number 7 to 83, in the trivalent state, preferably is included in the catalyst system to enhance the effectiveness of the noble metal halide catalyst, such as phosphines, arsines and amines and more particularly pyridine, quinoline and phosphines such as triphenylphosphine.

It will be appreciated that an important disadvantage of such a process is formed by the applied high operational pressure, while moreover its conversion rate and selectivity towards the desired product cannot be regarded as satisfactory.

On the other hand from West German Application No. 2,445,193 a process is known for the preparation of diethylketone by converting ethylene, carbon monoxide and water, at a temperature in the range of 150° C. to 300° C. and an operational pressure in the range of 100 to 350 atmospheres according to page 3, third paragraph and the examples, preferably 200–350 atmospheres and in the presence of a virtually water immiscible solvent, e.g. aromatic hydrocarbons such as benzene, toluene, xylenes and chlorobenzene and ketones, and a ruthenium compound as catalyst, and more particularly rutheniumhalide or a hydrate thereof.

Such a process actually has the same disadvantages and/or imperfections as mentioned hereinbefore, while moreover the applied amount of ruthenium compound per mole ethylene is rather large.

Due to the still growing demand for cheaper ketones which are suitably used as solvents on a still increasing scale for a variety of industrial processes, there is ongoing research for an improved manufacturing process, which can be operated under more simple conditions and which leads to improved conversion rate and selectivity to wards the desired ketones.

SUMMARY OF THE INVENTION

This invention relates to an improved process for the preparation of ketones by carbonylation of alkenes with carbon monoxide, in the presence of a hydrogen source such as a hydrogencontaining gas and/or water, and a catalyst system, containing a noble metal of group VIII of the Periodic Table of the Elements characterized in that the catalyst system comprises at least:

component (a)—a ruthenium compound,
component (b)—at least one acid selected from hydrohalogenic acids and carboxylic acids, having a pKa value $\leq 3$ (measured at 25° C. in aqueous solution), with said carbonylation being carried out in a water miscible solvent at pressures in the range from about 20 bar to about 100 bar and at a temperature in the range of about 70° C. to about 200° C.

DESCRIPTION OF THE PREFERRED EMBODIMENTS

In the process of the instant invention, an operational pressure in the range between about 50 bar and about 75 bar and an operational temperature in the range of about 100° C. and about 170° C. are used.

Carboxylic acids suitable for use in the catalyst system have a pKa value of $<2.5$. Suitable examples of acids to be used in the catalyst system are hydrochloric acid, hydrobromic acid, hydroiodic acid, trifluoroacetic acid, trichloroacetic acid, difluoroacetic acid, dichloroacetic acid, fluoroacetic acid, and chloroacetic acid.

It will be appreciated that a very attractive property of the above-identified process is the low operation pressure as compared with prior art processes, which feature leads to lower equipment costs due to the lower construction requirements. Moreover, no additional derivative of a Group V element, as is preferably used in the discussed prior art, is necessary in the present process for obtaining attractive results.

It has been found that the process according to the present invention shows an improved conversion rate and selectivity as compared with the discussed prior art. For example, with the present process, a selectivity $\geq 95\%$ and an ethylene conversion rate $\geq 100$ moles/gram-atom ruthenium may be reached for ethylene conversion.

As starting materials for the present process lower alkenes such as ethylene, propylene and butylene may be used. The present process, however, is preferably applied for the conversion of ethylene.

The quantity of component (a) used can vary within wide ranges and is generally in the range between about $10^{-6}$ and about $10^{-1}$ and preferably between about $10^{-5}$ and about $10^{-2}$ gram-atoms of ruthenium per mole starting alkene. The ruthenium compound is preferably a ruthenium halide, more preferably ruthenium chloride ($RuCl_3$) or a hydrate thereof are used.

The quantity of component (b) can also vary within wide ranges and is preferably present in a quantity in the range of from about 0.1 to about 100 and particularly from 0.5 to 20 equivalents per gram-atom of ruthenium. It will be appreciated that the desired hydrohalogenic acid to be used in the catalyst system alternatively can be formed in situ from the corresponding ruthenium halide and more preferably hydrochloric acid from $RuCl_3$ or its hydrate.

According to a typical embodiment of the present process, a water miscible solvent such as, for example, diglyme (dimethyl ether of di-ethylene glycol), diisopropyl sulfone, tetrahydrothiophene 1,1-dioxide (also referred to as sulfolane), 2-methyl-4-butyl sulfolane, 3-methyl-sulfolane, acetone, methyl isobutyl ketone is used. Other solvents which are miscible with water up to a substantial amount, or mixtures thereof can also be utilized. Preferably, diglyme, and sulfolane are used as solvents. The amount of hydrogen source such as, for example, hydrogen or water, which is present in the starting reactant mixture must be at least sufficient to provide 2 atoms of hydrogen per mole of alkene, while the molar ratio between alkene and carbon monoxide can vary between wide limits and preferably varies from about 10:1 to about 1:10. The molar ratio between hydrogen and carbon monoxide may vary in a wide range, preferably between about 10:1 and about 1:10. It will be appreciated that mixtures of carbon monoxide, hydrogen and an inert gas such as carbon dioxide, helium, argon, nitrogen etc. can also be utilized. Preferably, syngas mixtures which can be optionally diluted with an inert gas are used.

The process according to the invention may be carried out batchwise, continuously or semi-continuously. The reaction mixtures obtained may be subjected to suitable catalyst and product recovery processes comprising one or more steps, such as settling, solvent extraction, distillation, fractionation or adsorption. The catalytic system as well as unconverted starting compounds and/or solvent may be recycled, in part or entirely, to the reaction zone.

It will be appreciated that another aspect of the invention is formed by the catalyst system per se, at least comprising the following components:

component (a)—a ruthenium compound, and
component (b)—at least one acid selected from the group consisting of hydrohalogenic acids and carboxylic acids having a pKa $\leq 3$ (measured at 25° C. in aqueous solution).

Preferably, a carboxylic acid having a pKa $<2.5$ is used. More preferably, hydrochloric, hydrobromic acid hydroiodic acid, trifluoroacetic acid, trichloroacetic acid, dichloroacetic acid, difluoroacetic acid fluoroacetic acid and chloroacetic acid is used, being optionally mixed with a water miscible solvent as mentioned hereinbefore in an amount of from about 10 to about $10^6$ moles/gram-atom ruthenium. It will be appreciated that also catalyst compositions comprising the before mentioned components (a) and (b), in the before indicated proportion and a water miscible solvent, form an aspect of the present invention.

The following examples are intended to illustrate the invention and are not to be construed as limiting the invention.

The experiments were all carried out in a 250 ml magnetically stirred Hastelloy C autoclave ("Hastelloy" is a trade mark). The reaction mixtures obtained were analyzed by means of gas-liquid chromatography.

EXAMPLE 1

The autoclave was charged with 0.5 mmol RuCl$_3$, 10 ml water, 40 ml diglyme and flushed with carbon monoxide, sealed, charged with ethylene until a pressure of 25 bars and with carbon monoxide until a pressure thereof of 50 bar was obtained and heated at 160° C. After a reaction period of 5 hr the autoclave was allowed to adopt ambient temperature and opened for analysis of the reaction mixture. Diethylketone was produced with a carbon monoxide conversion rate 110 mol CO/gram-atom Ru/hr. The selectivity for diethylketone was more than 95% (5% propionic acid was formed).

EXAMPLE 2

In the same way as described under example 1, an experiment was carried out, starting from 0.5 mmol Ru(acac)$_3$, 50 ml diglyme, 2 mmol trifluoroacetic acid and 10 ml water. Diethylketone was produced with a conversion rate of 60 mol CO/gram-atom Ru/hr. The selectivity towards diethylketone was 85%.

EXAMPLE 3

In the same way as described under example 1, an experiment was carried out, starting from 0.5 mmol RuCl$_3$, 10 ml water, 50 ml diglyme and 30 ml propene, whilst the initial carbon monoxide pressure was 25 bar. Dipropylketone was produced with a conversion rate of 30 mol CO/gram-atom Ru/hr. and with a selectivity of 80%.

EXAMPLE 4

In about the same way as described under example 1, an experiment was carried out, starting from 0.5 mmol RuCl$_3$, 50 ml diglyme, 20 bar ethene, 20 bar carbon monoxide and 10 bar hydrogen. After a reaction time of 5 hours at 160° C. diethyl ketone was found to have been produced with a conversion rate of 150 mol CO/gram-atom Ru/hr. while the selectivity was 97%.

EXAMPLE 5

In the same way as described in example 1, an experiment was carried out, starting from 0,5 mmol Ru(acac)$_3$, 10 ml water, 50 ml diglyme, 2 mmol hydrochloric acid (added as 37% aqueous solution), 20 bar ethene and 20 bar carbon monoxide. After a reaction time of 5 hours at 150° C., a conversion rate of 70 mol CO/gram-atom Ru/hr. was calculated. The selectivity towards diethylketone was 90%.

EXAMPLE 6

In the same way as in Example 5 an experiment was carried out, when using 2 mmol hydroidic acid instead of hydrochloric acid, showing a conversion rate of 90 mol CO/gram-atom Ru/hr. and selectivity of 95%.

Comparative Example A

In the same way as described in example 1, an experiment was carried out, starting from 0,5 mmol Ru(acac)$_3$, 1.5 mmol benzene phosphonic acid, 50 ml diglyme, 10 ml water, 25 bar carbon monoxide, 25 bar ethene, showing a conversion rate of 70 mol CO/gram-atom Ru/hr. and selectivity for diethylketone of 37%.

Comparative Example B

When using 2 mmol benzoic acid instead of the benzene phosphonic acid, a conversion rate of 80 mol CO/gram-atom Ru/hr. was found and a selectivity of 58%.

Comparative Example C

When using 2 mmol acetic acid instead of the benzene phosphonic acid, a conversion rate of 50 mmol CO/gram-atom Ru/hr. was found and a selectivity of 60%.

From the examples and comparative examples it will be appreciated that the kind of acid to be used is rather critical, forming a non predictable feature for a person skilled in the art.

What is claimed is:

1. A process for the preparation of ketones which comprises carbonylating an alkene with carbon monoxide in the presence of a hydrogen source selected from the group consisting of hydrogen containing gas, water and mixtures thereof, and a catalyst system, containing a noble metal of the Group VIII of the Periodic Table of the Elements, wherein said catalyst system comprises:

component (a)—a ruthenium compound, and component (b)—at least one acid selected from the group consisting of hydrohalogenic acids and carboxylic acids having a pKa value $\leqq 3$ (measured at 25° C. in aqueous solution), wherein said carbonylation is carried out in a water miscible solvent, at a pressure in the range from about 20 bar to about 100 bar and at a temperature in the range of about 70° C. to about 200° C.

2. The process of claim 1, wherein said process is carried out at a pressure in the range of from about 50 bar to about 75 bar.

3. The process of claim 1, wherein said process is carried out at a temperature in the range of 100° C. to about 170° C.

4. The process of claim 1, wherein said catalyst system contains a carboxylic acid having a pKa value <2.5.

5. The process of claim 1, wherein said acid is selected from the group consisting of hydrochloric acid, hydrobromic acid, hydroiodic acid, trifluoroacetic acid, trichloroacetic acid, difluoroacetic acid, dichloroacetic acid, fluoroacetic acid and chloroacetic acid.

6. The process of claim 1, wherein said alkene is selected from the group consisting of ethylene and propylene.

7. The process of claim 1, wherein an amount of ruthenium compound ranging between about $10^{-6}$ and about $10^{-1}$ gram-atom ruthenium per mol starting alkene is used.

8. The process of claim 1, wherein an amount of ruthenium compound ranging between about $10^{-5}$ and $10^{-2}$ gram-atom ruthenium per mol starting alkene is used.

9. The process of claim 1, wherein component (b) is present in an amount in the range of from about 0.1 to about 100 equivalents per gram-atom ruthenium.

10. The process of claim 9, wherein component (b) is present in an amount in the range of from about 0.5 to about 20 equivalents per gram-atom ruthenium.

11. The process of claim 1, wherein component (a) is selected from the group consisting of ruthenium chloride ($RuCl_3$) and a hydrate of ruthenium chloride.

12. The process of claim 1, wherein said water miscible solvent is selected from the group consisting of diglyme(dimethyl ether of di-ethylene glycol), diisopropyl sulfone, tetrahydrothiophene 1,1-dioxide (referred to as sulfolane), 2-methyl-4-butyl sulfolane, 3-methylsulfolane, acetone, methyl isobutyl ketone and mixtures thereof.

13. The process of claim 12, wherein said water miscible solvent is diglyme.

14. The process of claim 12, wherein said water miscible solvent is sulfolane.

15. The process of claim 1, wherein said hydrogen source is water.

16. The process of claim 1, wherein a molar ratio between alkene and carbon monoxide in the range of from about 10:1 to about 1:10 is used.

17. The process of claim 1, wherein a molar ratio between hydrogen and carbon monoxide in the range of from about 10:1 to about 1:10 is used.

* * * * *